United States Patent
Friedman

(10) Patent No.: US 7,370,608 B1
(45) Date of Patent: May 13, 2008

(54) ANIMAL RESTRAINING AND CAPE OR VEST DEVICE

(76) Inventor: D. Rachel Friedman, 2553 Queenston Rd., Cleveland Heights, OH (US) 44118

(*) Notice: Subject to any disclaimer, the term of this patent is extended or adjusted under 35 U.S.C. 154(b) by 0 days.

(21) Appl. No.: 11/213,406

(22) Filed: Aug. 26, 2005

Related U.S. Application Data

(60) Provisional application No. 60/604,653, filed on Aug. 26, 2004.

(51) Int. Cl.
*A01K 13/00* (2006.01)

(52) U.S. Cl. ...................................... 119/850; 119/856

(58) Field of Classification Search ............... 119/850, 119/712, 714, 856, 858, 792, 793; 54/79; D30/145
See application file for complete search history.

(56) References Cited

U.S. PATENT DOCUMENTS

| | | | |
|---|---|---|---|
| 1,149,950 A * | 8/1915 | Hindskopf | 2/46 |
| 1,508,601 A * | 9/1924 | Huff | 119/792 |
| 1,685,435 A | 9/1928 | Philbeck | |
| 2,026,383 A | 12/1935 | Gvulav | |
| 2,778,335 A | 1/1957 | Hirsch | |
| 2,850,860 A * | 9/1958 | Torell et al. | 54/79.2 |
| 3,248,852 A * | 5/1966 | Schwartz | 54/79.1 |
| D228,926 S * | 10/1973 | Mengler | D30/145 |
| 3,768,445 A | 10/1973 | Sorrels | |
| 3,769,939 A | 11/1973 | Wais et al. | |
| 3,979,886 A * | 9/1976 | Johnson et al. | 54/79.2 |
| D281,028 S * | 10/1985 | Nichols | D30/145 |
| 4,676,198 A | 6/1987 | Murray | |
| 4,715,618 A * | 12/1987 | Harris | 119/771 |
| 4,838,206 A | 6/1989 | Anderson et al. | |
| D313,676 S * | 1/1991 | Indursky et al. | D30/145 |
| D313,677 S * | 1/1991 | Hammon et al. | D30/152 |
| 5,165,222 A * | 11/1992 | Cohen et al. | 54/79.2 |
| 5,199,383 A * | 4/1993 | Lagana | 119/858 |
| D337,864 S * | 7/1993 | Cullington et al. | D30/145 |
| 5,247,905 A | 9/1993 | Arakawa | |
| 5,325,819 A | 7/1994 | Krauss | |
| 5,329,885 A | 7/1994 | Sporn | |
| D363,572 S * | 10/1995 | Obenchain | D30/145 |
| 5,503,113 A * | 4/1996 | Knight | 119/856 |
| 5,511,515 A | 4/1996 | Brown et al. | |
| 5,632,235 A * | 5/1997 | Larsen et al. | 119/856 |
| D379,687 S * | 6/1997 | Curtis | D30/145 |
| 5,644,902 A * | 7/1997 | Kemp | 54/37.1 |
| D383,255 S * | 9/1997 | Caditz | D30/145 |
| 5,676,093 A | 10/1997 | Sporn | |
| 5,839,395 A * | 11/1998 | Kelley et al. | 119/850 |
| 5,893,339 A | 4/1999 | Liu | |

(Continued)

OTHER PUBLICATIONS

Arda, Dog Vest (found at http://www.ardainc.org/merch_dogvest.htm on Aug. 18, 2005).

(Continued)

*Primary Examiner*—Yvonne R. Abbott
(74) *Attorney, Agent, or Firm*—Todd L. Sladek

(57) ABSTRACT

Example animal restraining and cape and/or vest devices are described. One example device includes a cape and/or vest, an upper chest strap that includes a portion to which a leash can be attached, and one or more of a lower chest strap and an abdominal strap.

1 Claim, 13 Drawing Sheets

U.S. PATENT DOCUMENTS

| | | | |
|---|---|---|---|
| 5,896,831 | A | 4/1999 | Alpert |
| 5,915,335 | A * | 6/1999 | Holt, Jr. ..................... 119/771 |
| 5,950,569 | A * | 9/1999 | Perrulli ....................... 119/770 |
| 5,970,921 | A * | 10/1999 | Fulton ......................... 119/858 |
| 5,996,537 | A * | 12/1999 | Caditz ......................... 119/850 |
| D419,270 | S * | 1/2000 | Ruscitti ..................... D30/145 |
| 6,085,694 | A | 7/2000 | Simon |
| 6,089,194 | A * | 7/2000 | LaBelle ....................... 119/850 |
| D429,390 | S * | 8/2000 | Grady et al. ............... D30/152 |
| 6,095,094 | A * | 8/2000 | Phillips ....................... 119/792 |
| 6,119,635 | A * | 9/2000 | Powell-Lesnick ........... 119/850 |
| 6,123,049 | A * | 9/2000 | Slater .......................... 119/850 |
| 6,167,844 | B1 | 1/2001 | Cantrell et al. |
| 6,314,915 | B1 | 11/2001 | Pope et al. |
| D457,988 | S * | 5/2002 | Kerrigan .................... D30/145 |
| 6,443,101 | B1 * | 9/2002 | Fazio .......................... 119/792 |
| 6,450,130 | B1 | 9/2002 | Goldberg |
| 6,539,898 | B2 * | 4/2003 | Gatto .......................... 119/850 |
| 6,557,497 | B1 * | 5/2003 | Milligan ..................... 119/850 |
| 6,571,745 | B2 * | 6/2003 | Kerrigan ..................... 119/858 |
| 6,584,939 | B1 * | 7/2003 | Brezinski .................... 119/850 |
| D480,843 | S * | 10/2003 | Sullivan ..................... D30/152 |
| 6,637,367 | B1 * | 10/2003 | Dost et al. ................... 119/28.5 |
| 6,662,754 | B1 * | 12/2003 | Wilson ........................ 119/850 |
| D486,275 | S * | 2/2004 | Grubb ......................... D30/145 |
| 6,694,925 | B2 * | 2/2004 | Critzer ........................ 119/850 |
| 6,827,044 | B2 * | 12/2004 | Lobanoff et al. ........... 119/771 |
| 6,837,187 | B2 * | 1/2005 | Berardo ...................... 119/792 |
| 7,021,246 | B2 * | 4/2006 | Seymour ..................... 119/850 |
| 7,107,939 | B2 * | 9/2006 | Lady ........................... 119/792 |
| 2004/0000273 | A1 | 1/2004 | Lady |
| 2005/0039702 | A1 * | 2/2005 | Laffoon ....................... 119/850 |
| 2005/0072376 | A1 * | 4/2005 | Kerrigan ..................... 119/850 |
| 2005/0217609 | A1 * | 10/2005 | Dorton et al. .............. 119/792 |
| 2005/0284418 | A1 * | 12/2005 | Benefiel ...................... 119/850 |

OTHER PUBLICATIONS

Dunn's Fish Farm, Breathable Neoprene Dog Vest (found at http://www.dunnsfishfarm.com/product_219_detailed.htm on Aug. 18, 2005).

Hummingbird Designs, Dog Cape Coat (found at http://hummingbirdesign.com/dog_cape_coat.html on Aug. 18, 2005).

GundogsOnline.com, Remington Dog Chest Protector (found at http://www.gundogsonline.com/ProdDtl.asp?iProdID=11250 on Aug. 18, 2005).

The Company of Animals, HALTI Dog Harness (found at http://www.companyofanimals.co.uk/halti-harness.php on Aug. 18, 2005).

The Company of Animals, LUPI Harness (found at http://www.companyofanimals.co.uk/lupi.php on Aug. 18, 2005).

PamperedPuppy, Hoodie and Denim Dog Vest from Puppia (found at http://www.pamperedpuppy.com/features/merryv/200411_puppia.php on Aug. 18, 2005).

Softouch Concepts, SENSE-ation Dog Harness (found at http://www.softouchconcepts.com/products/sense_sation_harness.html on Aug. 18, 2005).

Softouch Concepts, SENSE-ible Dog Harness (found at http://www.softouchconcepts.com/products/sense_ible_harness.html on Aug. 18, 2005).

Wayne Hightower, New Dog Harness (found at http://www.waynehightower.com/ on Aug. 18, 2005).

* cited by examiner

ANIMAL RESTRAINING AND CAPE OR VEST DEVICE

CROSS REFERENCE TO RELATED APPLICATIONS

This application claims priority to provisional application No. 60/604,653, filed Aug. 26, 2004, which is herein incorporated by reference in its entirety.

BACKGROUND

Different types of animal restraining devices exist. The animal restraining devices may be used for different types of animals, including four-legged animals like dogs, for example. Examples of these restraining devices may include collars and harnesses. An example collar may be positioned around the neck of an animal. An example harness may be positioned on or around one or more other body parts of an animal. For example, one type of harness may include straps that fit around the upper chest, the lower chest, underbelly, and/or back of an animal. The straps may be attached to one another. Other types of harnesses exist. Combination collars and harnesses may also exist.

Example restraining devices placed on an animal may also be attached, for example, to a leash, rope, chain, and so on. The leash, rope, chain, and so on may be held by a person or attached to a stationary object, for example, for the purpose of restraining the animal or preventing the animal from wandering off. In one example, a dog may have a fitted collar or harness and the collar or harness may also be attached to one end of a leash. A person may hold the other end of the leash and walk the dog down the street without the dog running off, for example.

In addition to restraining devices, other devices may be placed on or fitted to an animal like a dog. One example of these devices may be capes or vests. Draping the capes or vests over the dog's back and securing the devices around the dog's underbelly and/or around the dog's chest may position the capes and vests on a dog, for example. An example cape may provide an area on one or both sides of a dog or other animal for lettering or designs that are visible to passersby when viewing the animal. One example use for a cape is to notify passersby that a dog is in training or is working so that passersby will not attempt to disturb the dog by petting it or disturbing it in some other way. In one example, the dog may be a service dog that is in training to lead a blind person or tend to a disabled person. In another example, the lettering or designs on a cape may be decorative. An example vest may resemble a cape and/or provide pockets or pouches. The pockets or pouches may allow a person to insert articles therein, providing for the dog or other animal to carry the articles. One example vest may resemble a saddlebag.

BRIEF DESCRIPTION OF THE DRAWINGS

The accompanying drawings, which are incorporated in and constitute a part of this application, illustrate various example devices and methods that illustrate various example embodiments of an animal restraining and cape and/or vest device. It will be appreciated that the embodiments shown in the figures represent examples of the devices. One of ordinary skill in the art will appreciate that other embodiments are contemplated and that the drawings are not meant to limit the scope of the example devices.

DETAILED DESCRIPTION

Example animal restraining and cape devices, animal restraining and vest devices, and animal restraining and cape and vest devices are described herein. The restraining and cape and/or vest devices may be positioned on a variety of different types of animals. One example animal is a dog. The example devices generally may provide both an attachment point for a leash and a cape and/or vest. One example device includes a collar that is positioned around a dog's neck and a cape or vest or combination cape and vest that is attached to the collar and positioned on or around the dog. Another example device includes a harness or partial harness and a cape or vest or combination cape and vest that is attached to the harness and positioned on or around the dog. Another example device includes a collar-harness combination that is attached to the cape or vest, or combination cape and vest. In one example, the collar (and/or harness) and the cape (and/or vest) may be separate pieces that, when in place on an animal, are configured as a single piece. In another example, the collar (and/or harness) and the cape (and/or vest) may be configured as a single piece that is placed onto an animal as a single piece. The devices generally may be configured to be attachable to a leash, rope, chain, and so on.

Figure 1:
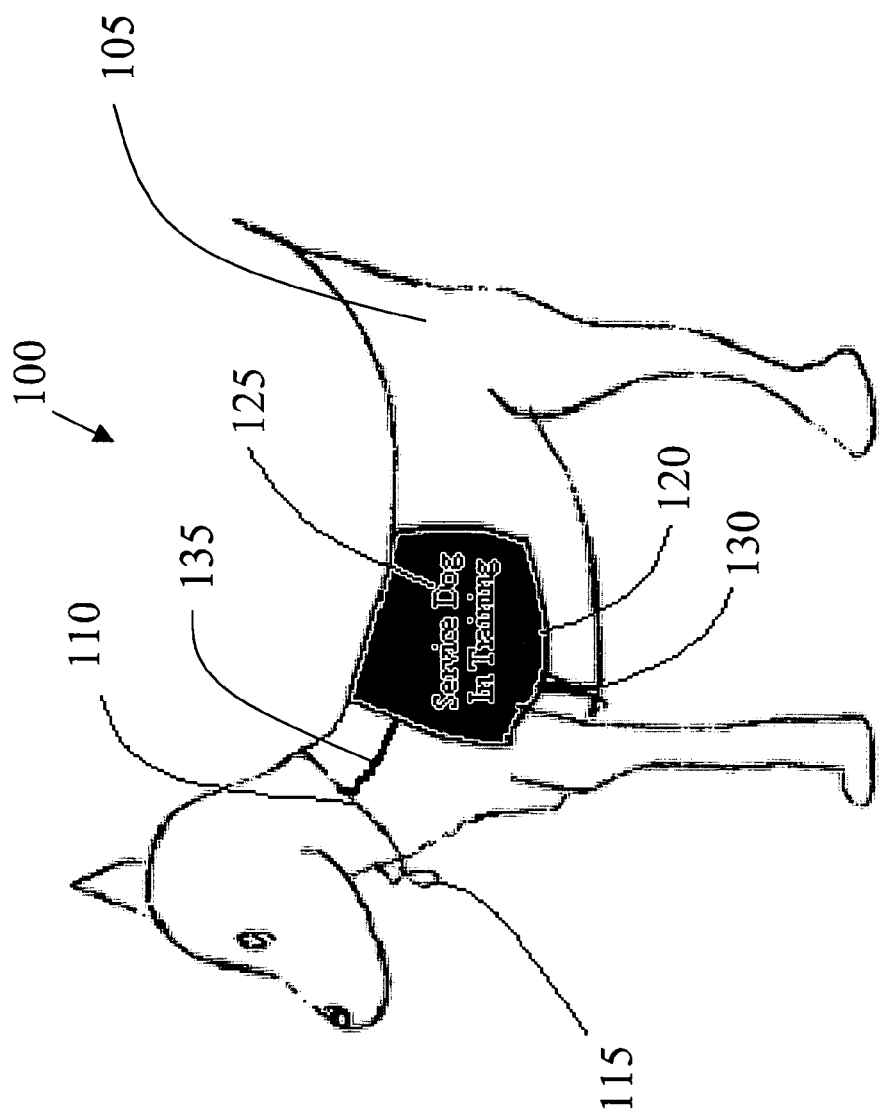
FIG. 1 is an illustration of an example restraining and cape device 100 positioned on a dog.

FIG. 1 is an illustration of an example restraining and cape device 100 positioned on a dog 105. The example device 100 may include a collar 110. The collar 110 may include an attachable portion 115 that may be attached to a leash, rope, chain, and so on. One example attachable portion 115 may be a ring. Example rings may include O-rings or D-rings. The example device 100 may include a cape 120. The cape may include lettering 125 and/or designs. The cape 120 may be held in place on the dog 105 by one or more straps, belts, and so on. One type of strap is an underbelly, abdomen, or lower chest strap 130. In the illustrated example, a lower chest strap is illustrated. There may be other types of straps, like an upper chest strap (not shown), for example. There may be one or more of these straps. The straps may have fasteners, buckles, clips, couplers, and so on, that make it possible to uncouple or disconnect two parts of a strap from one another or from the cape and then to recouple or reconnect the two parts. This uncoupling and recoupling may facilitate positioning of the straps and/or the device around the animal, for example. The cape 120 may be held in place on the dog 105 without straps, belts, and so on. For example, the cape may completely encircle a dog. For example, the cape may resemble a "tube" that surrounds a midsection of a dog. In one example, the "tube" may have a longitudinal zipper to secure the cape to the dog.

The cape 120 may be indirectly or directly attached to the collar 110. The cape 120 may be indirectly attached to a collar 110 through a variety of devices. In the illustrated example, the cape 120 is indirectly attached to the collar 110 through an attachment strap 135. The attachment strap 135 may have fasteners, buckles, clips, couplers, and so on, and may have length adjusters (see below). The attachment strap 135 may attach to different areas of the collar 110. The attachment strap 135 may attach to different areas of the cape 120. There may be one or more attachment strap(s) 135. One or more other components may be used to attach the cape 120 and the collar 110.

Figure 2:
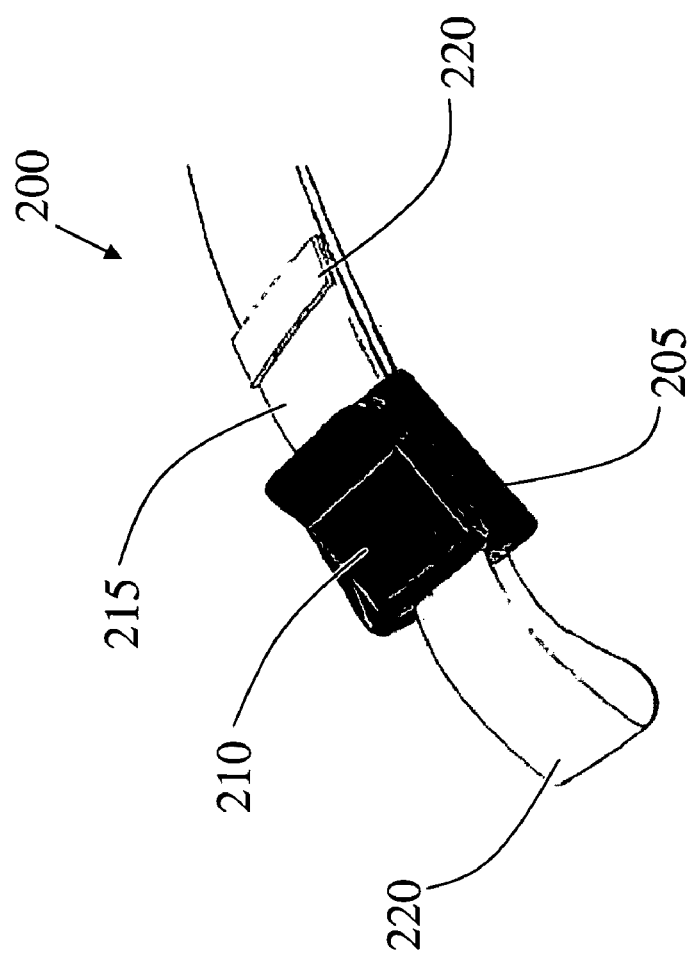
FIG. 2 is an illustration of an example length adjuster 200 for a strap.

FIG. 2 is an illustration of an example length adjuster 200 for a strap. The straps (e.g., 130, 135 in FIG. 1) may have example length adjusters 200 that allow the straps to be adjusted to different lengths, facilitating fitting of the device on animals of different sizes. The example length adjuster 200 may be a buckle. The example length adjuster 200 includes a base portion 205 and a hingeable portion 210. The length adjuster may be configured to hold a strap 215. The hingeable portion 210 may be rotated between an open and closed (illustrated) position. An end of the strap 220 may be threaded or slid through the base portion 205 of the length adjuster 200 and through the hingeable portion 210 when the hingeable portion 210 is positioned in the open position. The hingeable portion 210 may then be rotated to the closed position. In the closed position, the strap 215 is generally unable to slide through the length adjuster 200. In the closed position, the strap is generally held tightly between the hingeable portion 210 and the base portion 205. So positioned, the length of the strap 215 may be fixed. In the illustration, the strap 215 includes a loop 220. The loop may be attached to the cape, vest, additional strap, connector, hardware, and so on. A variety of other types of length adjusters may also be used.

Figure 3:
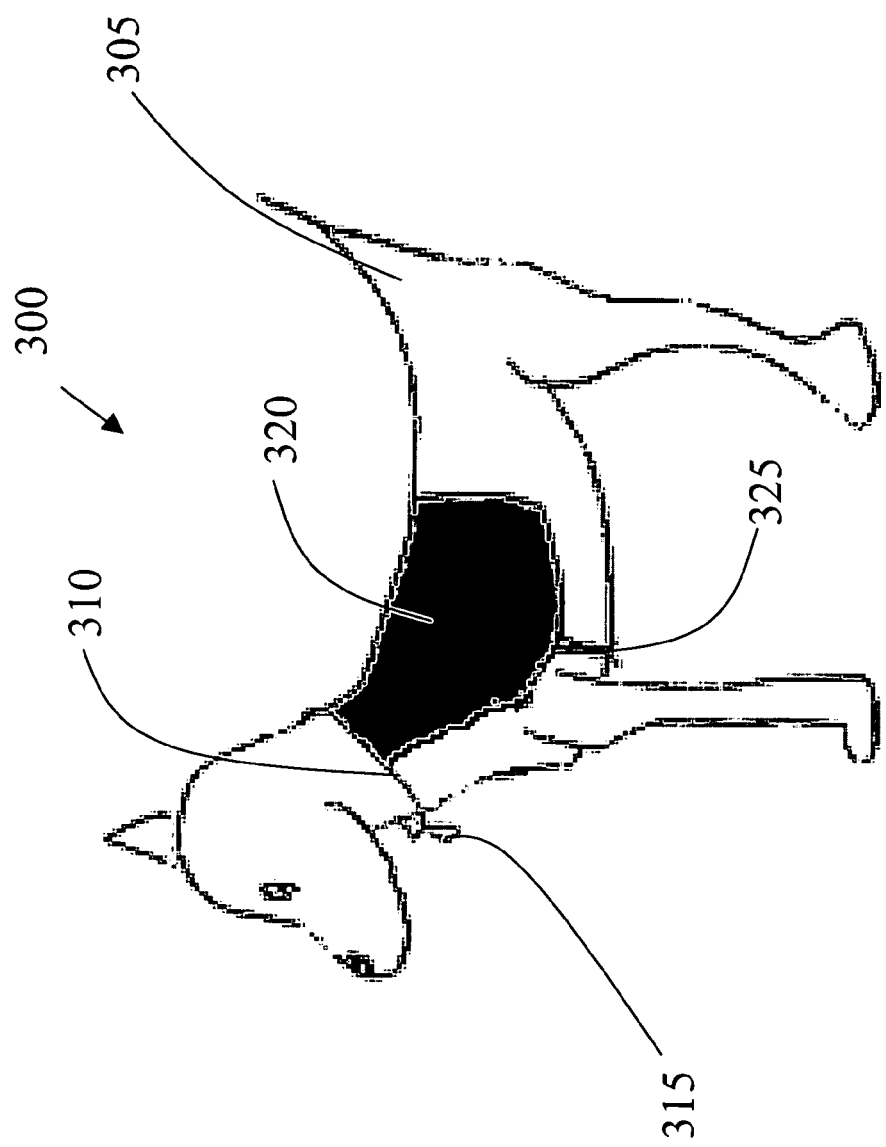
FIG. 3 is an illustration of an example restraining and cape device 300 positioned on a dog.

FIG. 3 is an illustration of an example restraining and cape device 300 positioned on a dog 305. The example device 300 may include a collar 310. In one example, the collar 310 may include an attachable portion 315 that may be attached to a leash, rope, chain, and so on. The example device may include a cape 320. The cape 320 may include lettering and/or designs (not shown). The cape 320 may be held in place on the dog 305 by one or more straps, for example. Illustrated is an example lower chest strap 325. There may be other types of straps, like an upper chest strap (not shown) and/or an underbelly or abdomen strap (not shown), for example. There may be one or more of these straps. In the illustrated example 300, the cape 320 is shown attached directly to the collar 310. The direct attachment may be permanent, as for example where a fabric collar is stitched to the cape. The direct attachment may be non-permanent, as for example where one or more snaps, buttons, zippers, and so on, facilitate attachment of the cape 320 and collar 310.

Figure 4:
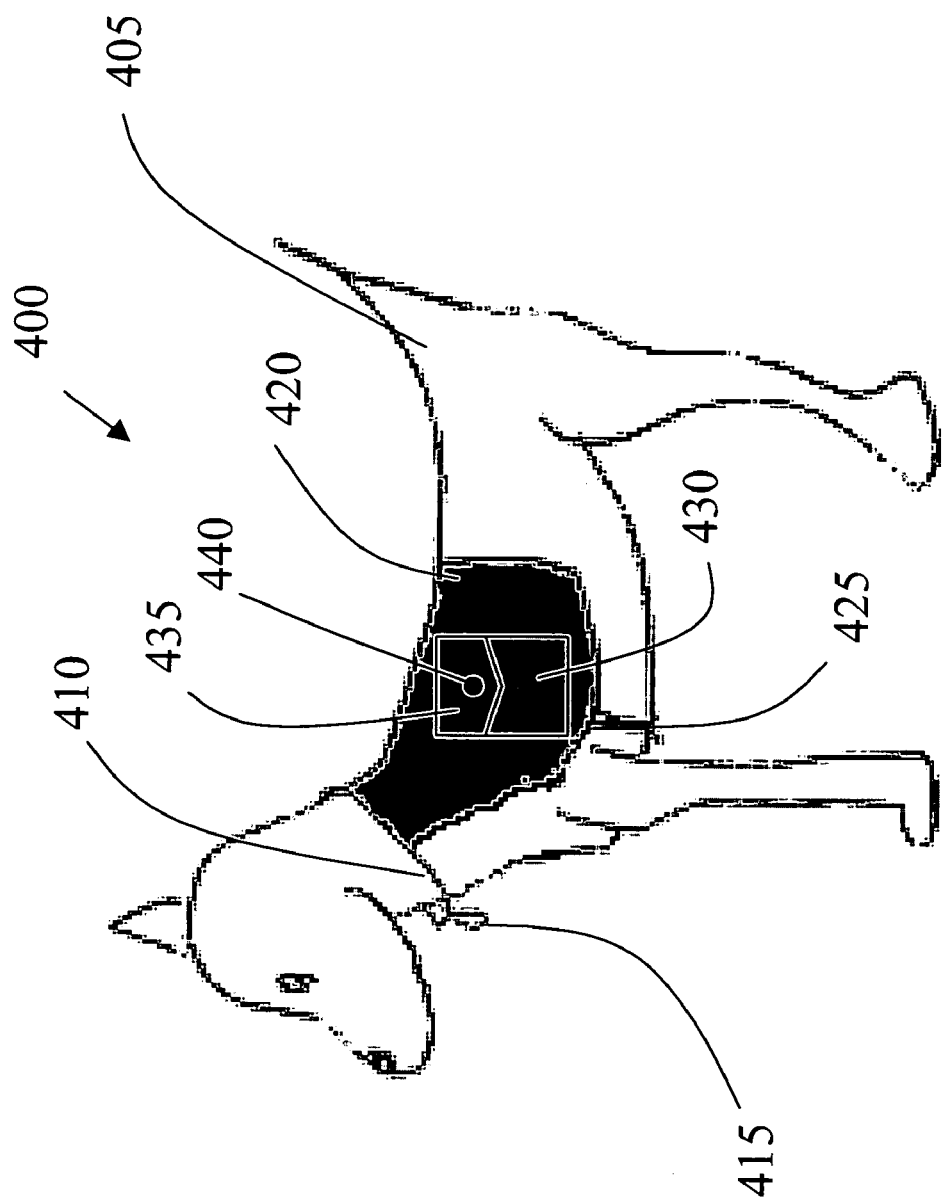
FIG. 4 is an illustration of an example restraining and vest device 400 positioned on a dog.

FIG. 4 is an illustration of an example restraining and vest device 400 positioned on a dog 405. The example device 400 may include a collar 410. The collar 410 may include an attachable portion 415 that may be attached to a leash, rope, chain, and so on. The example device 400 may include a vest 420. The collar 410 may be attached to the vest 420. The attachment of the collar 410 to the vest 420 may be direct or indirect. The attachment may be permanent or non-permanent. The vest 420 may be held in place on the dog 405 by one or more straps, for example. Illustrated is an example lower chest strap 425. Other or additional straps may include an upper chest strap and/or an underbelly/abdomen strap. The one or more straps may have fasteners, buckles, clips, couplers, and so on, facilitating uncoupling of two parts of a strap from one another or from another component, and recoupling the two parts. The uncoupling and recoupling may facilitate positioning of the straps and the device on the animal. The straps may also have length adjusters that facilitate adjustment of the straps to different lengths and fitting of the device to animals of different sizes, for example.

The example vest 420 may include one or more pockets 430. Items may be inserted into the pocket 430 and be carried by the dog 405 that wears the device 400. The vest 420 may include one or more pocket flaps 435. The vest may have a fastener 440 for securing the pocket flap 435 to the pocket 430. A variety of other types of pockets may be used. A variety of other types of components may be used to close the pocket (e.g., a zipper). The example vest 420 may include a variety of other components designed to contain or hold items. For example, the vest 420 may include one or more straps, loops, clips, hooks, and so on. Generally, pockets 430, straps, loops, clips, hooks, and so on, may be used to insert or attach items to the vest 420. The dog 405 that wears the device 400 may then carry or transport the items. There may be more than one, or combinations of, pockets 430, straps, loops, clips, hooks, and so on, attached to the vest 420.

Figure 5:
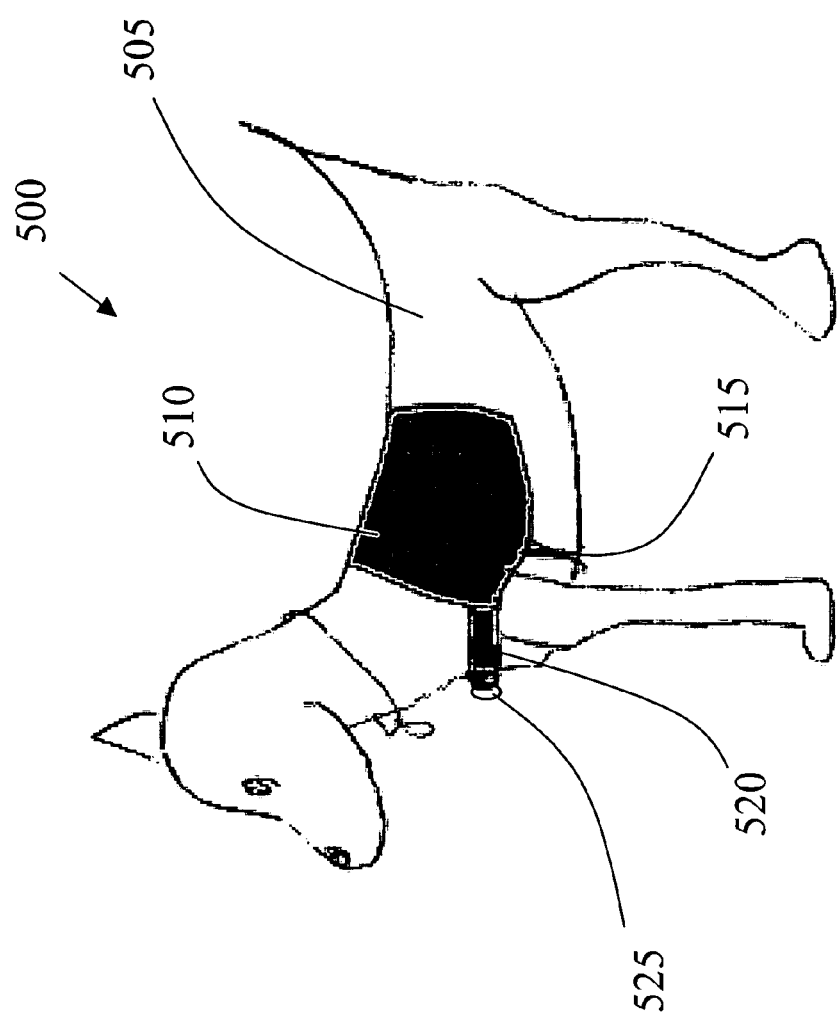
FIG. 5 is an illustration of an example restraining and cape device 500 positioned on a dog.

FIG. 5 is an illustration of an example restraining and cape device 500 positioned on a dog 505. Other examples may include a vest or may include a combination cape and vest. The illustrated device 500 includes a cape 510. The cape 510 may drape over the back of the dog 505 and extend around or partially around the dog 505. The cape 510 may include one or more straps. The straps may be attached to the cape 510. The straps may position or hold the device 500 on the dog 505. The device 500 may include one or more of an upper chest strap, a lower chest strap and an underbelly (or abdomen) strap. In the illustration, an upper chest strap 520 and a lower chest strap 515. One or more or the straps may include an attachable portion 525. In the illustrated example, the upper chest strap 520 includes an attachable portion 525, to which an example leash, rope, chain, and so on, may be attached. Example attachable portions 525 may include O-rings or D-rings. As described earlier, the straps may include fasteners, buckles, clips, couplers, and so on. The straps may also include example length adjusters.

Figure 6:
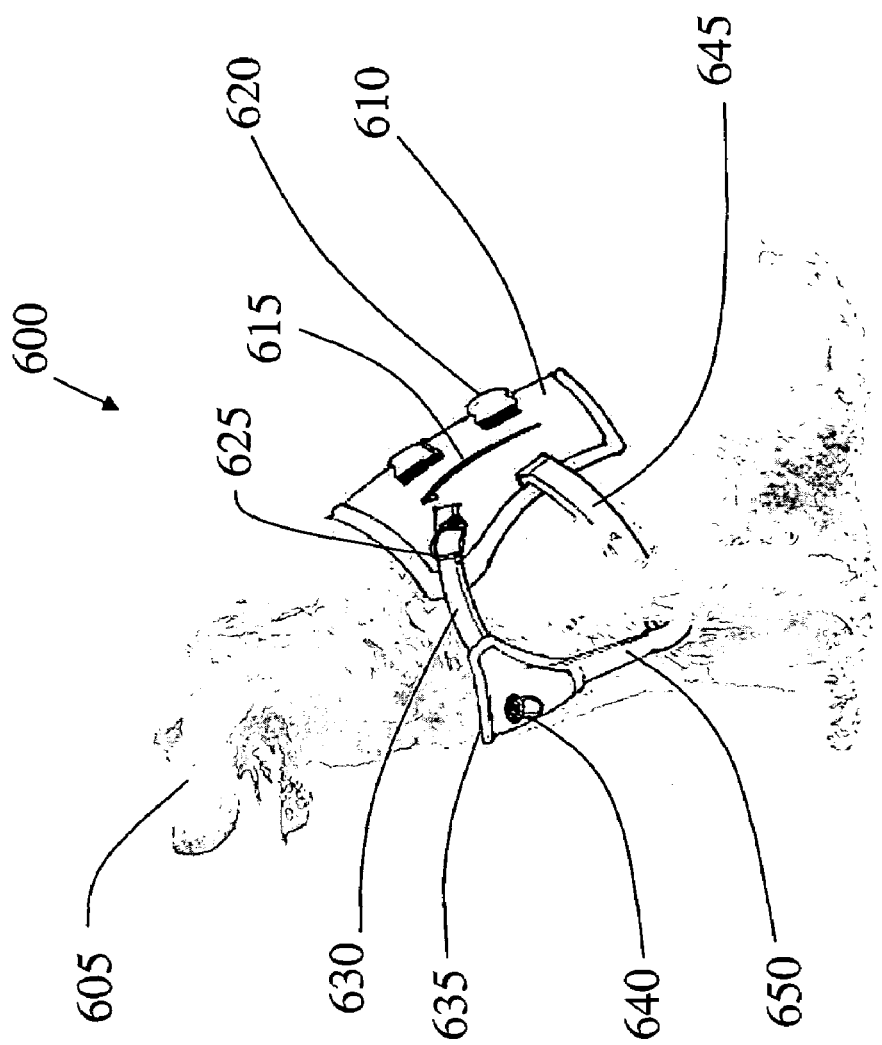
FIG. 6 is an illustration of an example restraining and vest device 600 positioned on a dog.

FIG. 6 is an illustration of an example restraining and vest device 600 positioned on a dog 605. The vest device 600 may include a vest 610. The example vest 610 includes a zippered pouch 615 and adjustable straps 620 for adjusting the fit of the vest 610 on the dog 605. The example device 600 includes upper chest straps 630 attached to the vest 610. The illustrated upper chest straps 630 include a length adjuster 625 for adjusting the length of the upper chest straps 630. The upper chest straps 630 may be attached to a strap connector 635. When the example device 600 is positioned on the dog 605, the strap connector 635 generally may be positioned over the chest of the dog 605. The strap connector 635 may include an attachable portion 640, to which an example leash, rope, chain, and so on, may be attached. The example device 600 also may include lower chest and/or underbelly straps. In the illustrated device 600, lower chest straps 645 are shown. The example device also includes a stabilizing strap 650. In the illustrated example, one end of the stabilizing strap 650 is attached to the lower chest strap 645. Another end of the stabilizing strap 650 is attached to the strap connector 635.

Figure 7:
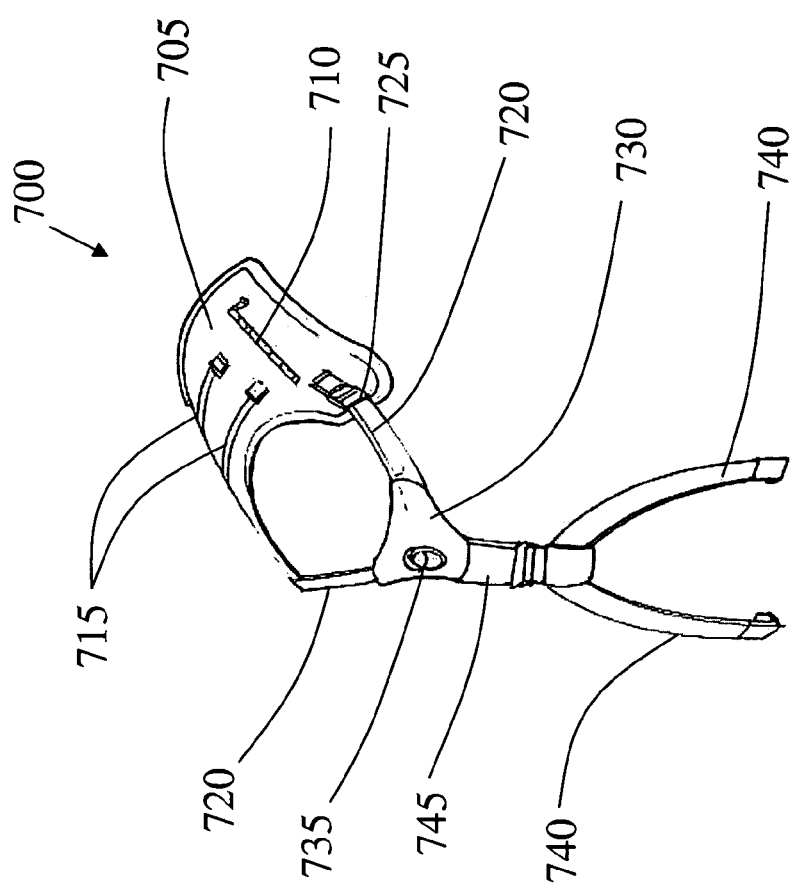
FIG. 7 is an illustration of an example restraining and vest device 700.

FIG. 7 is an illustration of an example restraining and vest device 700. The vest device 700 may include a vest 705. The example vest 705 includes a zippered pouch 710 and adjustable straps 715 for adjusting the fit of the vest 705 on a dog. The example device 700 includes upper chest straps 720 attached to the vest 705. The illustrated upper chest straps 720 include at least one length adjuster 725 for adjusting the length of the chest straps 720. The chest straps 720 may be attached to a strap connector 730. When the example device 700 is positioned on a dog, the strap connector 730 generally may be positioned over the chest of the dog. The strap connector 730 may include an attachable portion 735 (e.g., a ring), to which an example leash, rope, chain, and so on, may be attached. The example device 700 also includes lower chest straps 740 attached to the vest 705. The example device also includes a stabilizing strap 745. In the illustrated example, one end of the stabilizing strap 745 is attached to the lower chest straps 740. Another end of the stabilizing strap 745 is attached to the strap connector 730.

Figure 8:
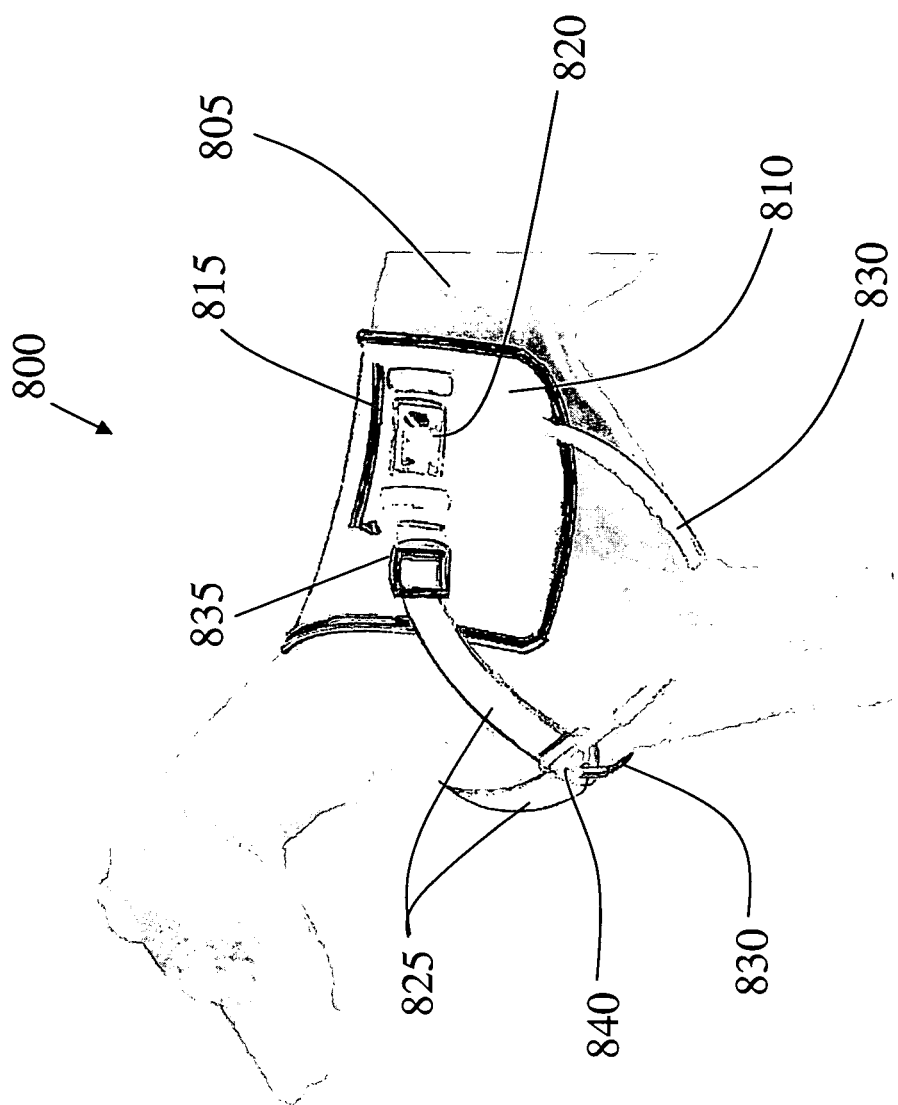
FIG. 8 is an illustration of an example restraining and vest device 800 positioned on a dog.

FIG. 8 is an illustration of an example restraining and vest device 800 positioned on a dog 805. The device may include a vest 810. The vest 810 may include a variety of components. In the illustrated device 800, the vest 810 includes a zippered pouch 815, into which objects may be placed. The vest 810 of the illustrated device 800 also includes a transparent pocket 820 into which, for example, a card may be placed. A message or design on the card may be visible to a viewer. The illustrated device 800 includes upper chest straps 825 and lower chest straps 830. One or more of, the upper chest straps 825 and the lower chest straps 830 may include length adjusters. In the illustrated device 800, the upper chest straps 825 include length adjusters 835. In the illustrated device 800, the upper chest straps 825 and the lower chest straps 830 are attached to a strap connector 840. The strap connector 845 may generally be positioned over the chest of the dog 805. One exemplary strap connector 845 is illustrated in FIG. 9.

Figure 9:
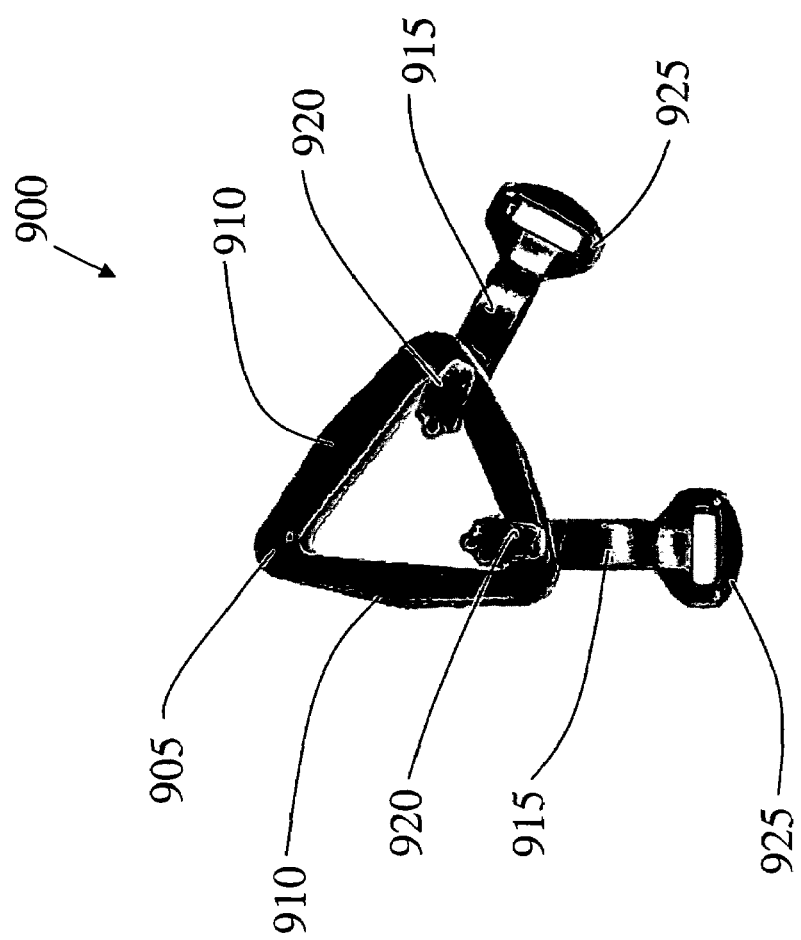
FIG. 9 is an illustration of an example strap connector 900.

FIG. 9 is an illustration of an example strap connector 900. The example strap connector 900 includes a body 905. The illustrated body 905 is triangular. Straps may attach directly to one or more sides 910 of the body 905. For example, a loop of a strap (see 220 of FIG. 2) may fit around a body side 910 (see FIG. 8). Straps may attach indirectly to the body 905. For example, one or more attachment pieces 915 may attach a strap to a body 905 of a strap connector 900. The illustrated attachment pieces 915 include a hook 920 securing the attachment piece 915 to the body 905. The illustrated attachment pieces 915 also include an eyelet 925, through which a loop of a strap (see 220 of FIG. 2) may be secured. The illustrated strap connector 900 is one of a variety of designs that may be used.

Figure 10:
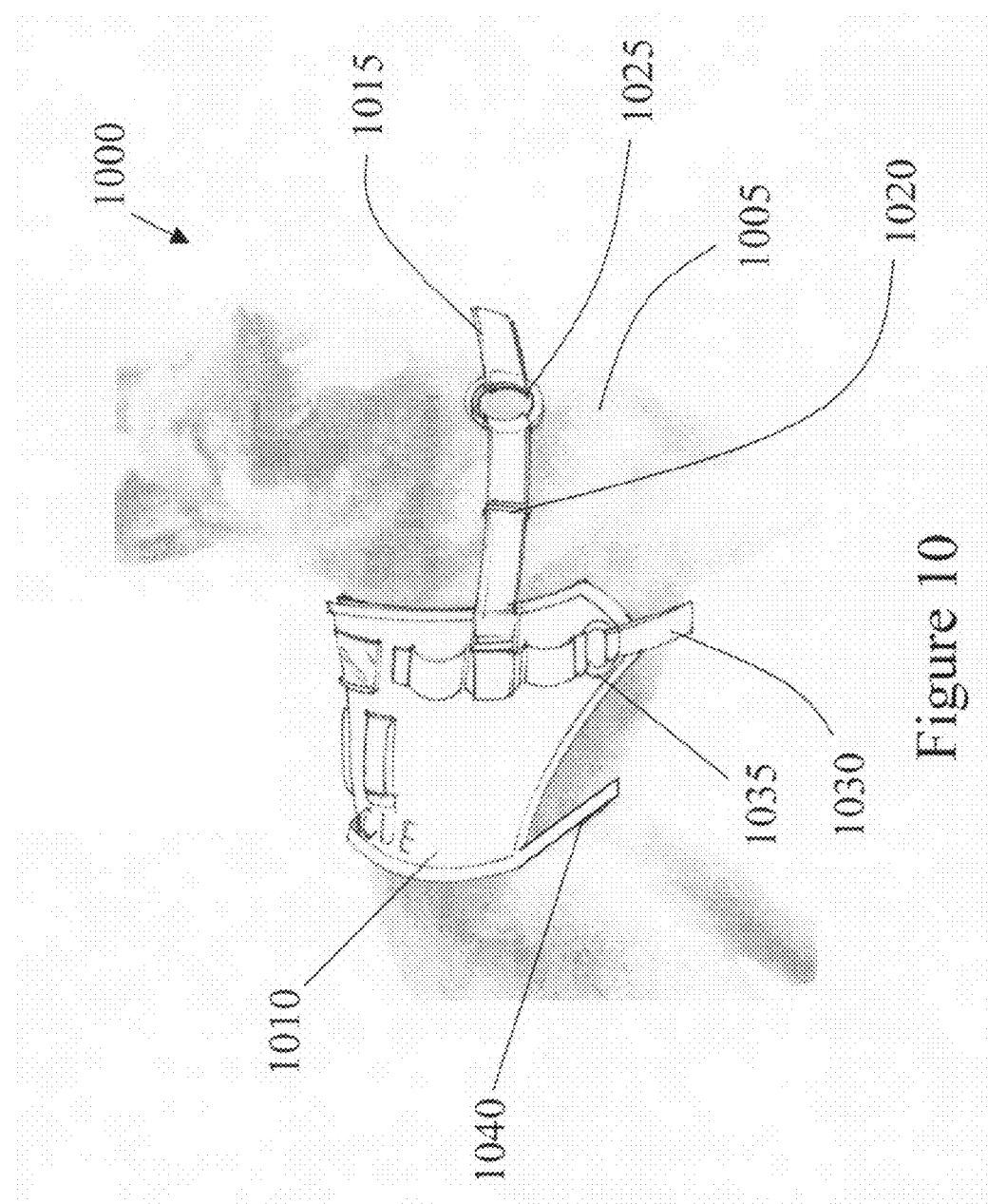
FIG. 10 is an illustration of an example restraining and cape device 1000 positioned on a dog.

FIG. 10 is an illustration of an example restraining and cape device 1000 positioned on a dog 1005. The device 1000 may include a cape 1010. Attached to the cape 1010 may be upper chest straps 1015. The upper chest straps 1015 may include strap length adjusters 1020. Generally, the upper chest straps 1015 may include an attachable portion, to which a leash, rope, chain, and so on, may be attached. In the illustrated example, the attachable portion includes an O-ring 1025. Attached to the cape 1010 may be lower chest straps 1030. The lower chest straps 1030 may include strap length adjusters 1035. Attached to the cape 1010 may be one or more abdomen or underbelly straps 1040, which may be adjustable.

Figure 11:
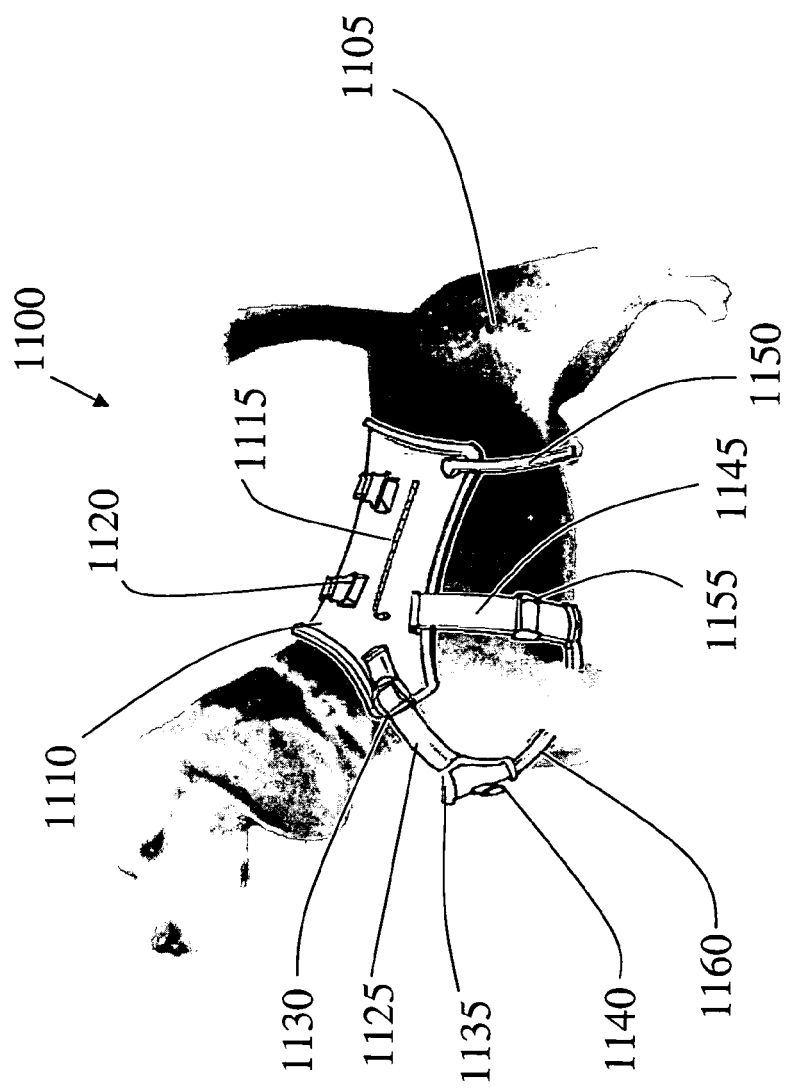
FIG. 11 is an illustration of an example restraining and vest device 1100 positioned on a dog.

FIG. 11 is an illustration of an example restraining and vest device 1100 positioned on a dog 1105. The vest device 1100 may include a vest 1110. The example vest 1100 includes a zippered pouch 1115 and adjustable straps 1120 for adjusting the fit of the vest 1110 on the dog 1105. The example device 1100 includes upper chest straps 1125 attached to the vest 1110. The illustrated upper chest straps 1125 include a length adjuster 1130 for adjusting the length of the upper chest straps 1125. The upper chest straps 1125 may be attached to a strap connector 1135. When the example device 1100 is positioned on the dog 1105, the strap connector 1135 generally may be positioned over the chest of the dog 1105. The strap connector 1135 may include an attachable portion 1140, to which an example leash, rope, chain, and so on, may be attached. The example device 1100 also may include lower chest and/or underbelly straps. In the illustrated device 1100, lower chest straps 1145 and underbelly 1150 straps are shown. The lower chest straps 1145 include strap length adjusters 1155. In the illustrated example, a stabilizing strap 1160 attaches the lower chest strap 1145 to the strap connector 1135. Other straps, including a stabilizing strap (not shown) attaching underbelly straps 1150 to lower chest straps 1145 may be included in other examples.

Figure 12:
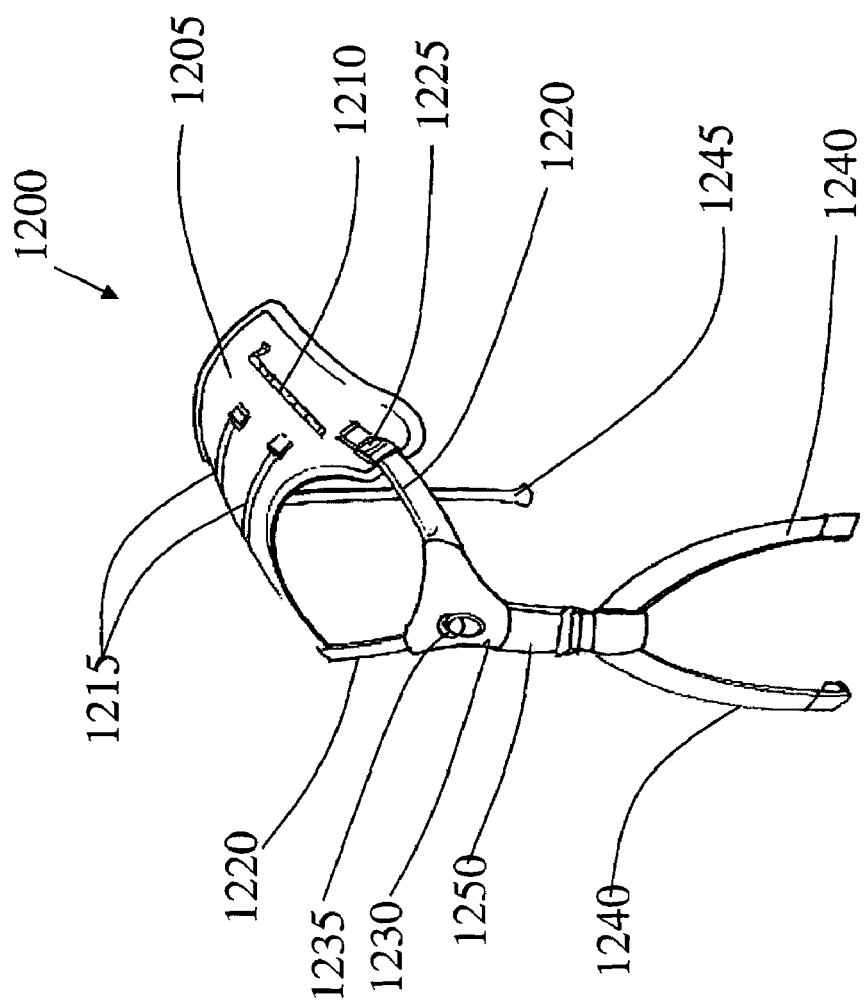
FIG. 12 is an illustration of an example restraining and vest device 1200.

FIG. 12 is an illustration of an example restraining and vest device 1200. The vest device 1200 may include a vest 1205. The example vest 1205 includes a zippered pouch 1210 and adjustable straps 1215 for adjusting the fit of the vest 1205 on a dog. The example device 1200 includes upper chest straps 1220 attached to the vest 1205. The illustrated upper chest straps 1220 include a length adjuster 1225 for adjusting the length of the upper chest straps 1220. The upper chest straps 1220 may be attached to a strap connector 1230. The strap connector 1230 may include an attachable portion 1235, to which an example leash, rope, chain, and so on, may be attached. The example device 1200 also may include lower chest and/or underbelly straps. In the illustrated device 1200, lower chest straps 1240 and an underbelly 1245 strap are shown. In the illustrated example, a stabilizing strap 1250 attaches the lower chest strap 1240 to the strap connector 1230.

Figure 13:
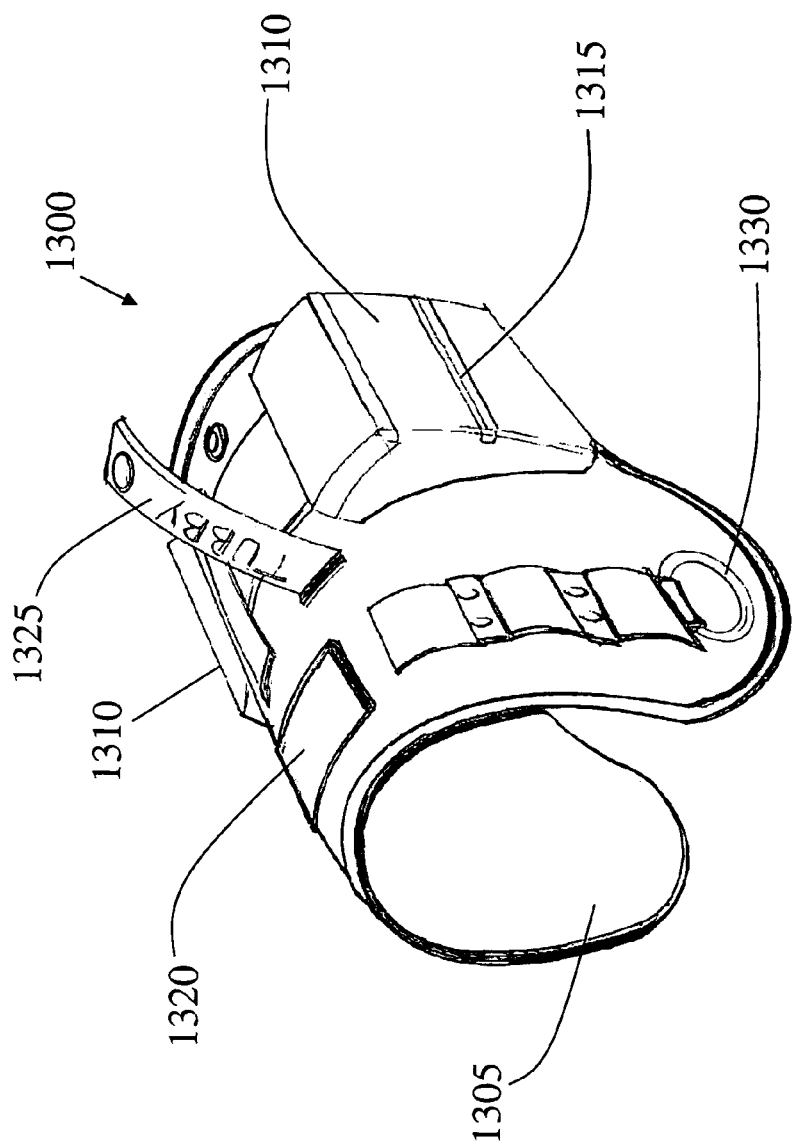
FIG. 13 is an illustration of an example restraining and vest device 1300.

FIG. 13 is an illustration of an example restraining and vest device 1300. The illustrated vest device 1300 includes a vest 1305. The vest 1305 includes pouches 1310 and a zippered pocket 1315. The vest 1305 includes a transparent pocket 1320 into which, for example, a card may be placed. The illustrated vest 1305 includes a display strap 1325, which may include lettering and/or a design. The vest 1305 also includes rings 1330 to which straps like upper chest, lower chest, and abdomen straps may be attached.

It will be appreciated that the components of the above-described devices may be of a variety of types and/or may be made of a variety of different types of materials. For example, a collar may be a choke chain, a chain that is not a choke chain, and so on. A collar may be made of one or more types of example metals, fabrics, webbings, nylons, and other types of materials. Also for example, a strap may be made of a variety of different types of materials, like fabric (e.g., canvas) webbing, nylon (e.g., mesh), Cordura®, designer fabrics, plastic, rubber, and so on. Also for example, a cape or vest may be made of a variety of different types of materials, like fabric (e.g., canvas), webbing, nylon (e.g., mesh), Cordura®, and so on. Other components, such as attachable portions, buckles, length adjusters, and so on, may be made of different types of materials and/or may be of different types. For example, some or all of these components may include metal, plastic, Velcro, Polartec®, Gore-Tex®, and so on.

While example devices and methods have been illustrated by describing examples, and while the examples have been described in considerable detail, it is not the intention of the applicant to restrict or in any way limit the scope of the device or methods to such detail. It is, of course, not possible to describe every conceivable combination of components or methodologies for purposes of describing the devices and methods described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the description herein. Furthermore, the preceding description is not meant to limit the scope of the invention.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Gamer, A Dictionary of Modern Legal Usage 624 (2d. Ed. 1995).

What is claimed is:

1. An animal restraining device, comprising:
a nylon or Cordura® cape that does not include and is not attached to a collar or neck strap, the cape configured to be draped over a back of the animal but not to completely encircle the midsection of the animal and not to cover or contact the chest of the animal;
a length-adjustable nonelastic upper chest strap attached to the cape at its ends, the upper chest strap configured to be positioned across and in contact with an upper chest of the animal when the cape is draped over the back of the animal, the upper chest strap including an O-ring or D-ring attached to a part of the upper chest strap that is positioned over the center of the chest of the animal, the O-ring or D-ring configured to be connected to a leash and not to be partially or totally uncoupled or disconnected from the upper chest strap;
a length-adjustable lower chest strap attached to the cape at its ends, with at least one end uncoupleable from the cape, the lower chest strap configured to be positioned across and in contact with the lower chest of the animal, behind the front legs of the animal, when the cape is draped over the back of the animal;
a length-adjustable underbelly or abdomen strap attached to the cape at its ends, with at least one end uncoupleable from the cape, the underbelly or abdomen strap configured to be positioned across and in contact with the underbelly or abdomen of the animal, when the cape is draped over the back of the animal;
where neither the lower chest strap, underbelly or abdomen strap is attached, or connected by an additional strap, to each other or to the upper chest strap.

* * * * *